United States Patent [19]
Stackawicz

[11] 3,834,644
[45] Sept. 10, 1974

[54] FISHING REEL AND APPURTENANCE

[76] Inventor: Carl Stackawicz, 73 N. Midland Ave., Kearny, N.J. 07302

[22] Filed: Nov. 28, 1972

[21] Appl. No.: 309,966

[52] U.S. Cl. .................. 242/84.2 G, 242/84.1 K
[51] Int. Cl. ........................................ A01k 89/00
[58] Field of Search..... 242/84.2 G, 84.2 R, 84.2 C, 242/84.2 D, 84.2 E, 84.2 F, 84.21 R, 84.21 A, 84.21 W

[56] References Cited
UNITED STATES PATENTS

| | | | |
|---|---|---|---|
| 2,713,463 | 7/1955 | Sarah | 242/84.21 R |
| 2,728,534 | 12/1955 | Wallace | 242/84.21 R |
| 3,670,984 | 6/1972 | Lemery | 242/84.2 G |

FOREIGN PATENTS OR APPLICATIONS

| | | | |
|---|---|---|---|
| 1,252,667 | 12/1960 | France | 242/84.2 G |
| 1,299,685 | 6/1962 | France | 242/84.2 E |
| 1,506,359 | 11/1967 | France | 242/84.2 G |
| 380,939 | 9/1932 | Great Britain | 242/84.21 R |
| 498,460 | 1/1939 | Great Britain | 242/84.2 G |
| 441,605 | 11/1948 | Italy | 242/84.2 G |

Primary Examiner—Stanley N. Gilreath

[57] ABSTRACT

A spinning reel comprising a reciprocable fishing line spool, a rotatable carrier coaxial with the spool, and a bail and a line guide extension of the ball having pivotal connections with the carrier for being moved to casting and line take-in positions with reference to the spool, is characterized by the improvement which includes, line brake means connected with the bail and line guide on the carrier and comprising a finger forming a nip with the line guide and the nip being entrant accessibly to a fishing line being laterally moved longitudinally of the bail on a course toward one of the pivotal connections of the bail and line guide with the carrier.

10 Claims, 5 Drawing Figures

PATENTED SEP 10 1974  3,834,644
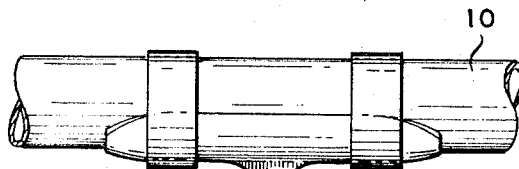
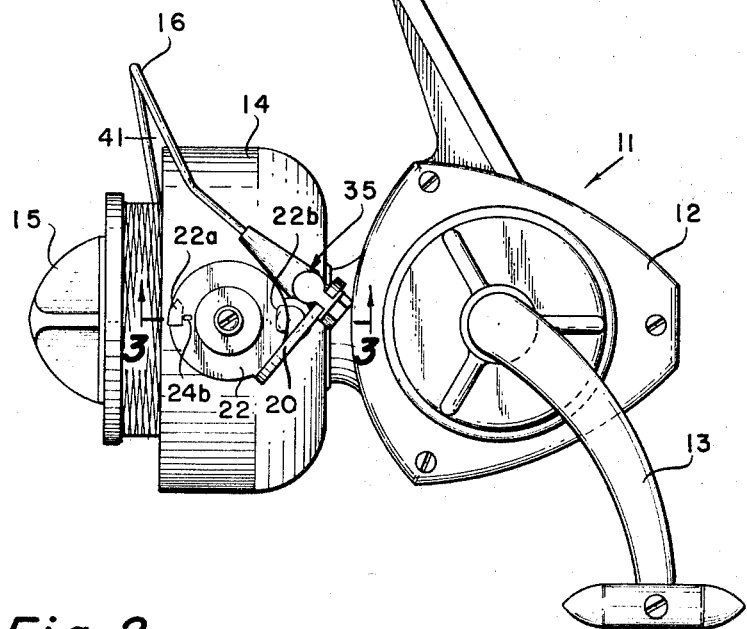
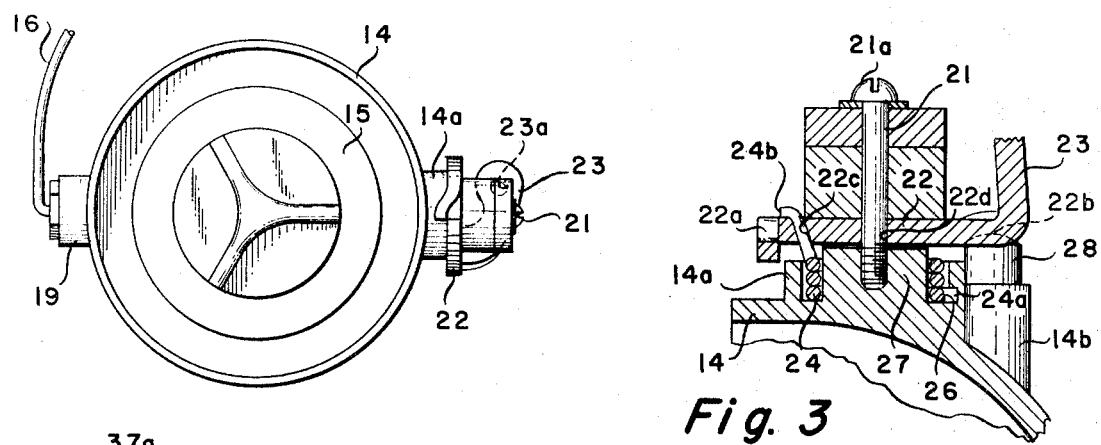
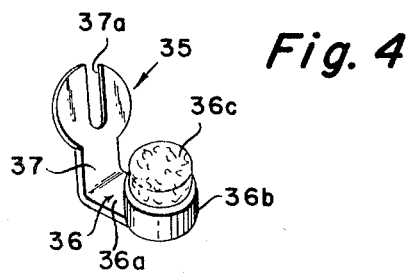
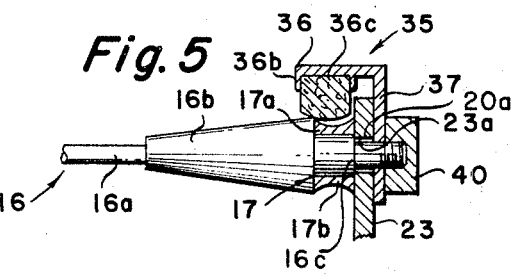

3,834,644

FISHING REEL AND APPURTENANCE

This invention relates to fishing reels and more particularly is concerned with spinning reels and spinning reel appurtenances.

Among conventional spinning reels are those which are characterized by having a rotatable carrier and a reciprocable spool coaxially interrelated, a bail and a line guide being pivotally connected with the rotatable carrier and associated with latching means for the bail and line guide to be adjusted to a line casting position or to a line take-in position with reference to the spool, and to be latched in either of those positions. The fishing line is reeled in by rotating the carrier and reciprocating the spool by means of a crank and an appropriate gear train, during which time the line rides upon the aforementioned line guide while being orbited about the spool. Before a cast is to be made the bail and line guide are adjusted to the line casting position so as to be free of the line. In casting, the line feeds outwardly from the spool past an end of the spool adjacent to an open end of the carrier.

When a fishing line is being taken onto the spool of a spinning reel, and the line is not subjected to a load outside the reel such as that of a caught fish, it becomes difficult for the line to wind and distribute properly upon the spool. Thereafter, the line in being cast feeds irregularly from poorly formed convolutions on the spool, thus destroying smoothness of the casting operation and being prone to tangle.

An object of the present invention is to interrelate line braking means, including a finger, with the bail and line guide of a spinning reel so as to have the finger form a braking nip for a fishing line with the line guide, this with the nip being entrant in the same general direction as that of lead of the bail toward the nip, thus for a fishing line laterally being moved longitudinally of the bail to enter the nip reliably while the bail and line guide are in line take-in position with reference to the spool, accordingly for the line to be braked in the nip, and thus be placed under tension between the nip and the spool throughout the time that the line is being wound onto the spool, and be readily releasable from the nip for free casting from the spool when the bail and line guide are in a casting position with reference to the spool.

Another object of this invention is the provision os spinning reels having features of the character indicated, and to provide accessories such as for conventional spinning reels so as to modify the latter reels with those accessories so as to achieve features of the character indicated.

Other objects herein in part will be obvious and in part pointed out more fully hereinafter.

In the accompanying drawing representing a preferred embodiment of the present invention:

FIG. 1 is a side elevational view representing a spinning reel and fishing line brake means appurtenant thereto;

FIG. 2 is a front elevation corresponding to FIG. 1 with portions of the fishing reel omitted;

FIG. 3 is a detail partially in section taken along line 3—3 in FIG. 1;

FIG. 4 is a perspective view of the fishing line braking means used with the reel represented in the preceding figures; and FIG. 5 is a detail, partially in section, focused upon a connection in the spinning reel of FIG. 1 and involving the fishing line brake means.

Referring now more particularly to FIG. 1 of the accompanying drawing, fishing equipment is provided which includes a fishing rod 10 having mounted thereon a spinning reel 11. Crank 13 of the spinning reel rotatably has power input to appropriate gear mechanisms within housing 12 for rotating a carrier 14 coaxially of a fishing line spool 15 and reciprocating the spool on the axis of the carrier, both the spool and the carrier being components of the spinning reel 11. A bail 16 and fishing line guide 17, which is an extension of the bail, are pivotally interconnected with the carrier 14, first at pivot 19 and oppositely through a pivotally adjustable arm 20 having pivotal connection to the carrier 14 by means including a machine screw 21. Arm 20 is angulated, comprising a plate 22, which is substantially circular in form, and a lever 23 integral with the rim of the plate and leading substantially normal to the plane of the plate. Detents 22a and 22b, spaced angularly apart from one another, are struck from the plate 22 for the plate to be detained in either a line casting position or in a line take-in position relatively to the spool 15 as will be described more fully hereinafter.

Carrier 14 is provided with a hollow annular boss 14a radially of the axis of spool 15, and the boss accommodates in the hollow thereof a helical spring 24, the latter having an end 24a anchored through leading radially into a notch 26 in the boss, and the other end 24b of the spring is anchored by being hooked into an eccectrically disposed aperture 22c in plate 22. Plate 22 furthermore has a central aperture 22d adjacent to which a post 27 projecting from the carrier 14 and disposed centrally of the hollow in boss 14a extends being internally threadedly engaged at outer end with the shank of the machine screw 21 and affording a bearing for plate 22. Head 21a of the machine screw 21 confines the plate 22 to the outer end of boss 14a and against the outer end of a plunger 28 which is within a tubular projection 14b of the carrier 14 along with a helical spring, not shown, suitably seated for biasing the plunger to engage either of the plate detents 22a and 22b which may be brought into registry with the plunger by angular movement of plate 22, thereby detaining the plate. The helical spring 24 within boss 14a is wound such as in favor of having that spring drive arm 20 from a position wherein the plunger 28 is engaged with the plate detent 22a to a position wherein the plunger is engaged with the plate detent 22b, the first named position corresponding to a line take-in position of the bail 16 and line guide 17 with reference to spool 15 and the second named position corresponding to a line casting position of the bail and line guide with reference to the spool, the latter position being represented in FIG. 1.

Fishing line brake means 35 connected with the bail 16 and line guide 17 for moving pivotally with the bail and line guide on the carrier 14, comprises a finger 36 so as to have a pressure applicator thereof hereinafter to be described form a nip with the line guide. The nip so formed is entrant accessibly to a fishing line being laterally moved on the bail longitudinally of the bail on a course toward lever 23 of the pivoted arm 20. Leading toward an aperture 20a in the outer end of lever 23, bail 16 has a conical transition portion 16b connected with wire 16a of the bail and thus has a progressively increasing diameter toward lever 23. A reduced cylindrical extension 16c of the bail, from the conical transition portion 16b, leads through the lever aperture 23a and is threaded at outer end, there receiving a securing nut 40 against lever 23. Line guide 17 includes a sleeve 17a received on the cylindrical extension 16c and interposed between lever 23 and the conical transition portion 16b of the bail, sleeve 17a having therein an annular declivity 17b which is entrant laterally of the bail. Internally, the sleeve 17a fits within close tolerances the cylindrical extension 16c of the bail, and externally a portion of this same sleeve and an adjacent portion of the conical transition portion 16b of the bail are substantially equal in diameter to assure smooth lateral movement of a fishing line longitudinally of the bail to and from the annular declivity 17b, the sleeve 17a furthermore being rounded longitudinally of the bail into the declivity 17b to assure smooth guidance of a fishing line to and from the declivity longitudinally of the bail.

Finger 36 of the fishing line brake means 35 includes a blade 36a which is integral with the tab 37 of the fishing line brake means 35 and the tab has an aperture 37a therein which is elongated longitudinally of the tab to enable adjustment of the fishing line brake means in being mounted. The finger blade 36a and tab 37 are preferably made of a flexible resilient material such as spring-quality steel. A tip of finger 36 includes a cup 36b, such as of metal, which is connected with an outer end portion of the finger blade 36a and opens laterally of the blade on the same side of the blade as that from which the tab 37 leads, and the finger tip further includes a pressure applicator in the form of a pad 36c, such as of felt, leather, rubber or the like, securely in the cup 36b and projecting from the cup laterally of the blade.

In spinning reel 11, the cylindrical extension 16c of the bail is jogged to bear against the inner face of lever 23 while the end thread of this extension receiving the nut 40 is on a reduced portion of this extension leading through aperture 20a in the arm, thus to interpose the line guide sleeve 17a within close tolerances between arm 20 and the conical transition portion 16b of the bail and enable sleeve 17a to constitute a roller on the cylindrical extension 16c of the bail after the nut 40 has been tightened against arm 20.

The fishing line brake means 35 is installed upon the spinning reel 11 by backing off the nut 40 on the cylindrical extension 16c of the bail far enough for thereafter inserting tab 37 between lever 23 and nut 40 and incidentally disposing extension 16c within the elongated aperture 37a in the tab. Meanwhile, the blade 36a of finger 36 if situated to coextend longitudinally with the bail 16 and line guide 17, and the fishing line brake means 35 bodily is moved by shifting the tab 37 with reference to the cylindrical extension 16c of the bail in order to move the finger blade 36a laterally and have the pad 36c press radially against the fishing line guide sleeve 17a and across the declivity 17b so as to form a nip with the guide sleeve, after which the nut 40 is tightened to secure the fishing line brake means 35 in the given position. As situated, the pad 36c has a braking effect upon a fishing line after the latter has been introduced into the declivity 17b and is longitudinally moved. Moreover, the fishing line has ingress and egress with reference to the nip formed between the pad 36c and the line guide sleeve 17a simply by being laterally moved longitudinally of the bail and line guide.

Advantage is had from installing the fishing line brake means 35 so as to dispose the pad 36c of the finger externally of an opening 41 bounded by arm 20, the bail 16 and line guide 17, and the carrier 14, as they are connected in the spinning reel 11. This disposition of the pad enables the fishing line leading outside that opening from spool 15 and in contact with the bail 16 to be outside the inner radial confines introduced by the bail and line guide as is usual in the use of spinning reels.

When the bail 16 is brought into line take-in position, the fishing line is pressed against the guide sleeve 17a, while in the declivity 17b, by the pad 36c, and as the carrier 14 is rotated on operation of the spinning reel crank 13 the guide sleeve and pad are carried orbitally and the fishing line is placed under tension by the braking effect exercised by the pad as the fishing line is wound onto the spool 15. It will also be realized that the fishing line by being relatively moved laterally of itself with reference to the pad and guide sleeve, and longitudinally of the bail 16, is readily released from the nip.

As the present invention lends itself to many possible embodiments and as many possible changes may be made in the embodiment hereinbefore set forth, it will be distinctly understood that all matter described herein is to be interpreted as illustrative and not as a limitation.

I claim:

1. In spinning reel structure for use in fishing, the combination which includes; a spool for a fishing line; a rotatable carrier coaxial with said spool for being rotated relatively to said spool; bail and line guide means having first and second pivotal connections with said carrier for said bail and line guide means to be moved about said pivotal connections to casting and line take-in positions with reference to said spool, said bail and line guide means including bail means and line guide means carried with said bail means for guiding a fishing line being taken onto said spool on rotation of said carrier with said bail and line guide means being in said line take-in position; and fishing line brake means comprising finger means having an inner end portion rigidly connected with said bail means for said finger means to move with said bail and line guide means about said pivotal connections, and said finger means projecting in a longitudinally coextending laterally opposing relation with said line guide means and having an outer free end portion comprising pressure applicator means forming a nip with said line guide means laterally from said finger means, said nip being entrant accessibly to a fishing line laterally moved on said bail and line guide means and for said pressure applicator means to press the fishing line against said line guide means in said nip and have the fishing line taken onto said spool on rotation of said carrier while having said bail and line guide means in said line take-in position.

2. In spinning reel structure as set forth in claim 1 wherein said pressure applicator means includes a pad for said pad to apply pressure to a fishing line against said line guide means in said nip while the fishing line is passing onto said spool.

3. In spinning reel structure as set forth in claim 1 wherein said line guide means is characterized by having a declivity therein laterally of said bail and line guide means for said pressure applicator means to apply pressure to a fishing line against said line guide means in said declivity while the fishing line passes through said declivity onto said spool.

4. In spinning reel structure as set forth in claim 1 wherein said line guide means is characterized by including a roller on the axis of said bail means, and said pressure applicator means is adjacent to said roller for applying pressure to a fishing line on said roller while the fishing line passes onto said spool.

5. In spinning reel structure as set forth in claim 1 wherein said line guide means is characterized by having a declivity therein laterally of said bail and line guide means, and said pressure applicator means includes a pad for said pad to apply pressure to a fishing line against said guide means in said declivity while the fishing line passes through said declivity onto said spool.

6. In spinning reel structure as set forth in claim 5 wherein said line guide means is characterized by including a roller coaxial with said bail means, and said declivity is in said roller.

7. In spinning reel structure as set forth in claim 1 wherein said brake means has an extension leading from said inner end portion of said finger means, and fastening means engaging a portion of said bail and line guide means adjacent to said line guide means secures said extension of said brake means rigidly to an arm and rigidly with reference to said bail means, on of said pivotal connections of said bail and line guide means, with said carrier, connecting said arm with said carrier for said bail and line guide means to pivot with said arm on said carrier.

8. In a spinning reel structure as set forth in claim 7 wherein said extension of said brake means includes a tab leading from said inner end portion of said finger means laterally of said inner end portion of said finger means, said tab and said arm each having an aperture therein for receiving a screw threaded portion of said bail and line guide means for said brake means to be moved laterally of said screw threaded portion of said bail and line guide means to adjust said finger means laterally of said line guide means, and said fastening means being screw threaded engaging said threaded portion of said bail and line guide means to secure said bail means, said arm and said tab rigidly together.

9. In spinning reel structure as set forth in claim 8 wherein said line guide means is characterized by having a declivity therein laterally of said bail and line guide means for said pressure applicator means to apply pressure to a fishing line against said line guide means in said declivity while the fishing line passes through said declivity onto said spool.

10. In spinning reel structure as set forth in claim 8 wherein said pressure applicator means includes a pad for said pad to apply pressure to a fishing line on said line guide means while the fishing line is passing onto said spool.

* * * * *